United States Patent [19]

Hayashi et al.

[11] Patent Number: 5,500,178
[45] Date of Patent: Mar. 19, 1996

[54] METHOD OF MANUFACTURING HOLLOW MOLDED ARTICLES

[75] Inventors: Toshihiro Hayashi; Hiroshige Kohno; Akinori Watanabe, all of Tokyo; Itaru Horiguchi, Ryugasaki, all of Japan

[73] Assignees: Asahi Denka Kogyo Kabushikikaisya; Okamoto Industries, Inc., both of Tokyo, Japan

[21] Appl. No.: 97,222

[22] Filed: Jul. 27, 1993

[30] Foreign Application Priority Data

Jul. 31, 1992 [JP] Japan .................. 4-205370

[51] Int. Cl.⁶ ................ A23G 3/12; A23P 1/00
[52] U.S. Cl. ............ 264/297.8; 264/311; 264/313; 425/430; 425/434; 425/435; 425/DIG. 44; 426/280; 426/514; 426/515
[58] Field of Search ............ 264/310, 311, 264/313, 297.8, 297.9; 426/514, 515, 280; 425/DIG. 44, 429, 430, 434, 435

[56] References Cited

U.S. PATENT DOCUMENTS

| | | | |
|---|---|---|---|
| 720,718 | 2/1903 | Maddock et al. | 264/313 X |
| 1,467,351 | 9/1923 | Blunt | 426/514 X |
| 1,576,149 | 3/1926 | Siegert | 426/514 |
| 1,898,252 | 2/1933 | Lantinberg et al. | 426/514 |
| 1,908,732 | 5/1933 | Cohen | 426/514 |
| 2,472,754 | 6/1949 | Mead | 264/DIG. 78 X |
| 2,536,689 | 1/1951 | Krebs et al. | 264/313 X |
| 2,781,273 | 2/1957 | Koch | 264/313 X |
| 2,796,033 | 6/1957 | Feinstein . | |
| 3,072,965 | 1/1963 | Miller | 264/310 |
| 3,279,917 | 10/1966 | Ballard et al. | 264/313 X |
| 3,326,142 | 6/1967 | Town . | |
| 3,529,553 | 9/1970 | Rutter . | |
| 4,076,207 | 2/1978 | Austin | 426/515 X |
| 4,093,175 | 6/1978 | Putzer et al. | 425/DIG. 44 X |
| 4,212,621 | 7/1980 | Michelotti | 425/DIG. 44 X |
| 4,315,037 | 2/1982 | Kelly | 264/373 X |
| 4,582,682 | 4/1986 | Betz et al. | 425/DIG. 44 X |
| 4,854,843 | 8/1989 | Takeda et al. . | |
| 5,090,885 | 2/1992 | Stalin | 425/DIG. 44 X |
| 5,154,937 | 10/1992 | Fujishima | 425/DIG. 44 X |
| 5,330,346 | 7/1994 | Scardovi | 425/DIG. 44 X |

FOREIGN PATENT DOCUMENTS

| | | | |
|---|---|---|---|
| 445530 | 11/1912 | France . | |
| 2468455 | 5/1981 | France . | |
| 2539670 | 1/1983 | France . | |
| 2014366 | 4/1990 | France | 426/514 |
| 976082 | 1/1963 | Germany . | |
| 1151722 | 7/1963 | Germany . | |
| 1757372 | 4/1971 | Germany . | |
| 2940939 | 4/1981 | Germany | 426/515 |
| 1128840 | 6/1986 | Japan | 426/515 |
| 507662 | 7/1971 | Switzerland . | |
| 394489 | 7/1933 | United Kingdom . | |

OTHER PUBLICATIONS

Patent Abstracts of Japan vol. 13, No. 310 (M–850) 14 Jul. 1989 & JPA 01 097 611 (Inoue Hiroshi et al.) 17 Apr. 1989.

*Primary Examiner*—Karen Aftergut
*Attorney, Agent, or Firm*—Sherman and Shalloway

[57] ABSTRACT

A method of manufacturing hollow molded articles having a beautiful surface at a low cost and by a simple and efficient process includes providing a hollow elastic molding die made of an elastic film and having an opening port, feeding a material to be molded of an amount smaller than the internal volume of the elastic molding die into the elastic molding die through the opening port, closing the opening port, solidifying the material to be molded while the elastic molding die is rotated to all directions, and parting the solidified hollow molded article from the elastic molding die. Arrangement for preventing the elastic molding die from being deformed while it is rotated to all directions includes holding it firm by a solid holding member conforming to the external shape thereof or by positioning it in a fluid or powdery material holding member.

13 Claims, 3 Drawing Sheets

METHOD OF MANUFACTURING HOLLOW MOLDED ARTICLES

BACKGROUND OF THE INVENTION

1. Field of the Invention

The present invention relates to a method of manufacturing hollow molded articles, such as chocolates, candies, dolls, stationary ornaments, and the like, using an elastic molding die.

2. Description of the Prior Art

Hollow molded articles, such as hollow chocolates, hollow candies, dolls, stationary ornaments, and the like, are conventionally known. Such hollow molded articles are manufactured using a plurality of separable molding dies made of a rigid material with a shape conforming to the shape of the articles to be molded. The materials to be molded of an amount smaller than the internal volume of the separable molding dies are fed into the molding dies through their opening ports, and, after closing the opening ports, the separable molding dies are installed in a spinner to be rotated in all directions. The materials to be molded are solidified along the internal surface of the separable molding dies to form hollow articles, while the molding dies are rotated in all directions. After this, the separable molding dies are divided to take out the hollow molded articles.

The hollow molded articles manufactured by this type of separable molding dies, however, have partition lines of the separable molding dies on their surface, giving rise to the deterioration of their commercial value. In particular, a number of separable molding dies are required when complicated hollow molded articles are to be manufactured, making it difficult to manufacture hollow molded articles with a beautiful surface appearance. The use of many separable molding dies also renders the manufacturing process complicated. In addition, because the separable molding dies are made of rigid materials, their manufacturing cost is significant, greatly affecting the manufacturing cost of the hollow molded articles. In particular, in the case where a variety of different hollow molded articles are manufactured, each in a small number, a significant portion among the total manufacturing cost of the hollow molded articles must be shared by the cost for manufacturing the separable molding dies. It is thus extremely difficult in actual practice to manufacture such hollow molded articles at an acceptable cost. Furthermore, conventional separable molding dies made of synthetic resin such as polycarbonate exhibit poor heat conductivity, giving rise to an impaired work efficiency in the molding operation for manufacturing hollow molded articles, for which heating or cooling are essential in order to solidify the material to be molded while the separable molding dies are rotated in all directions.

SUMMARY OF THE INVENTION

An object of the present invention therefore is to solve and improve the above-mentioned drawbacks and problems in the manufacture of hollow molded articles using conventional separable molding dies, to provide an inexpensive, simple, and efficient method of manufacturing hollow molded articles using an elastic molding die, and to provide hollow molded articles with beautiful surface.

The inventors of the present invention completed this invention by focussing their attention on the application of a hollow elastic molding die made of an elastic film and having an opening port, instead of the separable molding dies, for molding the hollow articles.

Specifically, the above object has been achieved according to the present invention by the provision of a method of manufacturing a hollow molded article, which comprises providing a hollow elastic molding die made of an elastic film and having an opening port, feeding a material to be molded of an amount smaller than the internal volume of said elastic molding die into said elastic molding die through said opening port, closing said opening port, solidifying said material to be molded while said elastic molding die is rotated in all directions, and parting the solidified hollow molded article from the elastic molding die.

In a preferred embodiment of the present invention, said elastic molding die is rotated in all directions while held firm by a holding member conforming to the external shape thereof.

In another preferred embodiment of the present invention, said elastic molding die is rotated in all directions while positioned in a fluid or powdery material holding member conforming to the external shape thereof.

The above and other objects, features and advantages of the invention will become more apparent from the following description when taken in conjunction with the accompanying drawings, in which:

DETAILED DESCRIPTION OF THE INVENTION AND PREFERRED EMBODIMENTS

The elastic mold used in the method of the present invention is a hollow elastic molding die made of an elastic film and having an opening port. The elastic molding die is made of an elastic film of an elastomer such as natural rubber, chloroprene rubber, or the like. The elastic molding dies are well known per se in the art. The method of molding articles using the elastic molding dies are also conventionally known.

In the present invention, the material to be molded is fed into this elastic molding die, and, after closing or clogging the opening port of the elastic molding die, the elastic molding die is rotated in all directions, while the material to be molded in the elastic molding die is solidified. In this instance, use of the material to be molded of an amount smaller than the internal volume of the elastic molding die ensures solidification of that material along the internal surface of the elastic molding die providing a hollow space therein, thus affording a hollow molded article. The solidification of the molding material can be effected by heating or cooling while rotating in all directions.

Figure 1:
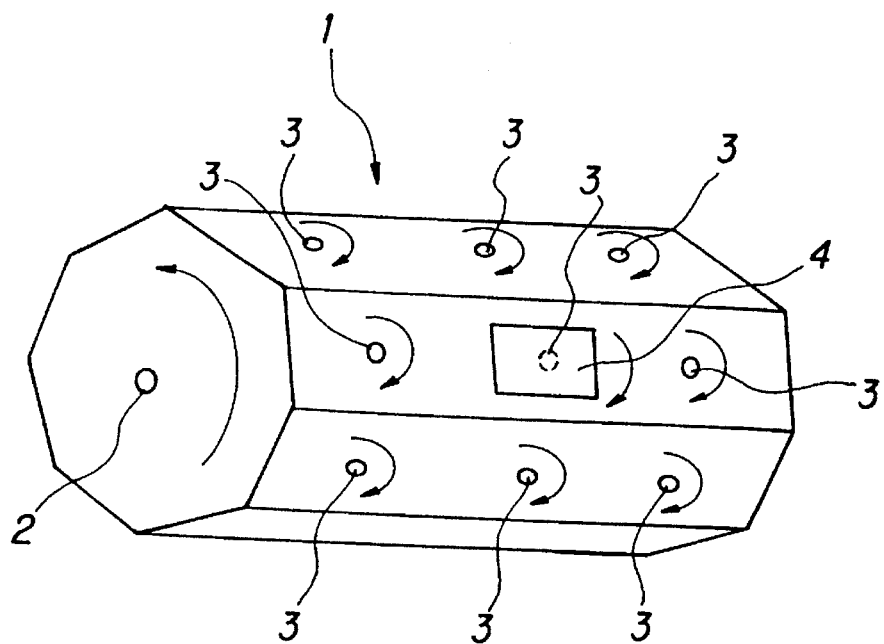
FIG. 1 is a perspective view of one embodiment of a spinner used in the method of the present invention.

The use of a spinner as shown in FIG. 1 is preferred for rotating the elastic molding die in all directions. In FIG. 1, spinner 1 has a shape of an octagonal prism, which is rotatable around axis 2. Provided on each surface of spinner 1 are a plurality of axes of rotation 3, each of which are aligned perpendicular to axis 2. The elastic mold in this manner is rotated around its own axis 3 while at the same time it is rotated around a central or second axis 2. The axes of rotation are each perpendicular to the axis of rotation 2. Container 4 has a hole (not shown in the Figure) in the center of the bottom for engaging said axis of rotation 3 on the surface of spinner 1 for mounting the container 4 thereon. Elastic molding dies in which a prescribed amount of the material to be molded is filled are housed in container 4, which is then mounted on spinner 1 by engagement with the axis of rotation 3 provided on the surface of spinner 1. Spinner 1 is then rotated, while the container 4 mounted on the surface of the spinner also rotates by the rotation of the axis of rotation 3, thus enabling the elastic molding die housed in the container 4 to rotate in all directions. The rotation rate of the spinner is desirably 4 to 5 per minute for both the axes of rotation 2 and 3.

It is necessary in the method of the present invention to tightly seal the opening port of the elastic molding die so as to prevent the materials to be molded from escaping from this opening port, since the elastic molding die is rotated to all directions after the materials have been filled in the molding die. This tight seal of the elastic molding die can be achieved by the following method.

Figure 2:
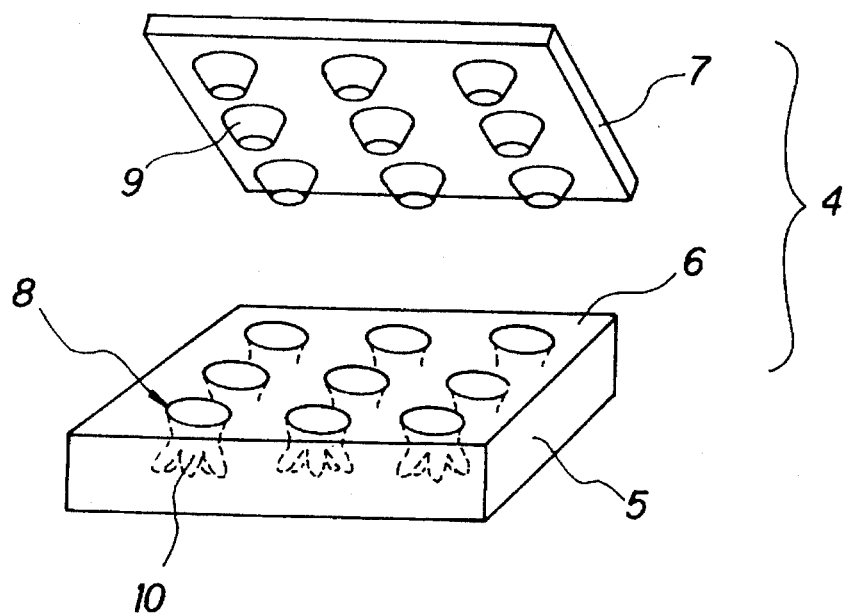
FIG. 2 is a perspective view of one embodiment of a container to be mounted on the spinner of FIG. 1 used in the method of the present invention.
Figure 3:
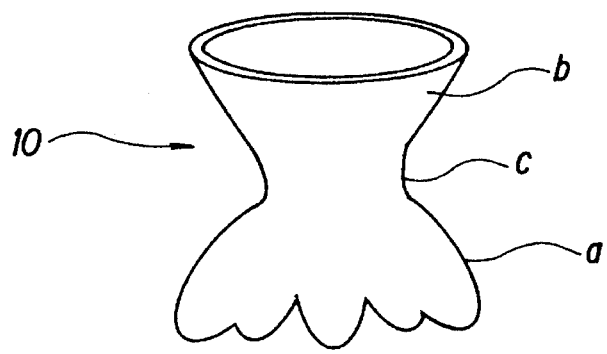
FIG. 3 is a perspective view of one embodiment of an elastic molding die used in the method of the present invention.

FIG. 2 shows an example of the method of achieving such tight seal, in which 4 designates whole container to be engaged with the axis of rotation 3 provided on the surface of spinner 1. The container has a main body 5 and a medium cover 6, in which holes 8 are provided for holding the edge of supporting member b of the elastic molding die 10 shown in FIG. 3. Main cover 7 for container 4 is provided on its back protrusions 9 made of an elastic material and having a shape conforming to the supporting member b of elastic molding die 10. Each elastic molding die 10, as shown in FIG. 3, consists of an elastic molding portion a, a supporting member b, and an opening port c. The supporting member b has a conical shape, for example, expanding outwardly from the opening port c.

First, the elastic molding die is inserted into hole 8 provided on medium cover 6 of container 4. The edge of supporting member b is held by hole 8, thus bringing elastic molding die 10 to the state where it is suspended from medium cover 6. Next, a prescribed amount of the material to be molded is fed into elastic molding portion a of elastic molding die 10 from opening port c, following which main cover 7 is put on main body 5 of container 4. Because main cover 7 is provided with truncated cone shaped closing member projections 9 made of an elastic material which conform to conically shaped supporting member b of the elastic molding die, covering the container with the main cover 7 enables opening port c of the elastic molding die to be closed by the truncated cone shaped closing member projection 9 provided on the back of the main cover 7, thus ensuring tight sealing of opening port c of the elastic molding die. This prevents the material to be molded from escaping from the elastic molding die, even if it is rotated in all directions.

Figure 4:
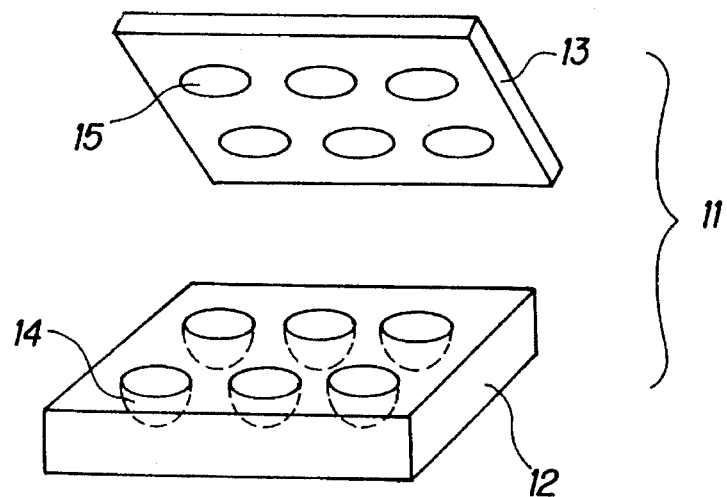
FIG. 4 is a perspective view of another embodiment of a container to be mounted on the spinner of FIG. 1 used in the method of the present invention.
Figure 5:
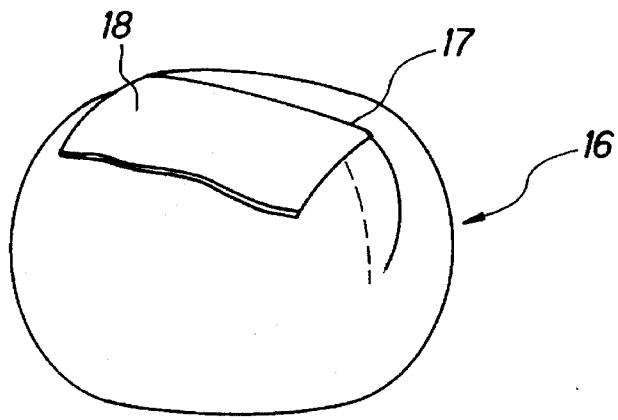
FIG. 5 is a perspective view of another embodiment of an elastic molding die used in the method of the present invention.

FIGS. 4 and 5 are drawings illustrating another embodiment of the method of the present invention. FIG. 4 shows container 11 as a whole for engaging the axis of rotation 3 on the surface of spinner 1. Container 11 consists of main body 12 and cover 13. Provided in the main body 12 are holes 14 forming solid holding members conforming to the external shape of the elastic molding die, and on the back of cover 13 are concaves 15 for pressing the upper portion of the elastic molding die. In FIG. 5, 16 designates the elastic molding die as a whole. After feeding a prescribed amount of the material to be molded into the elastic molding die, the die is inserted into hole 14 of main body of the container 12. Then, extruded leaf 18 provided on opening port 17 of elastic molding die 16 is folded to close the opening port, following which cover 13 is applied to main body 12. After this, container 11 is fitted to axis of rotation 3 on the surface of spinner 1 and rotated. In this manner, the elastic molding die is brought to the condition where it is tightly sealed by hole 14 in main body 11 of the container and concave 15 on cover 13, thus preventing the material to be molded from flowing out even if the elastic molding die is rotated in all directions. In this instance, in order to close the opening port 17 of the elastic molding die, it is possible to provide a projected leaf 18 over the opening port and to fold it as explained above. It is further possible to provide one or more cuts between the opening port and intermediate of the elastic molding die and further provide a leaf or leaves for covering the cuts. In this manner, the tight seal of the elastic molding die can be smoothly performed and partition of the molded articles from the elastic molding die can be easily carried out.

Figure 6:
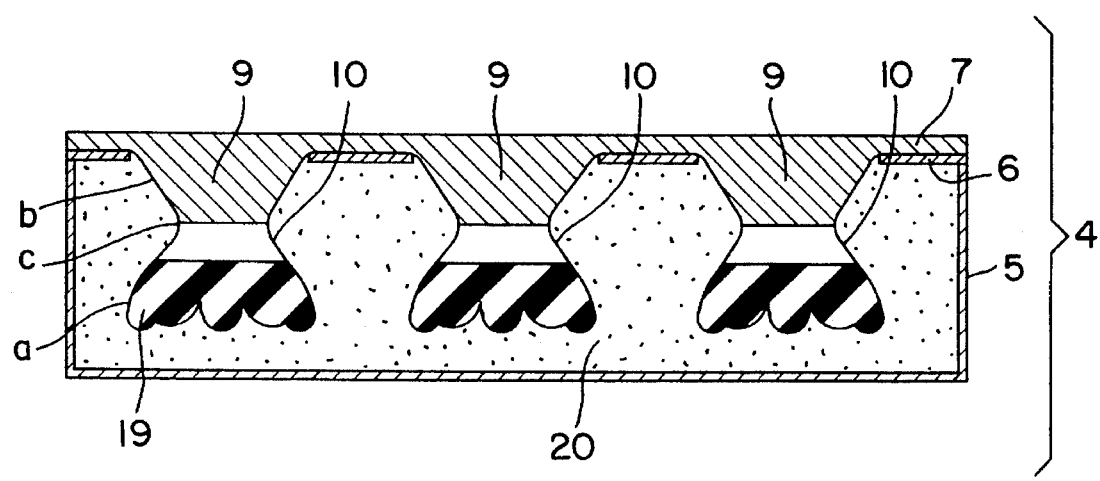
FIG. 6 of the drawings is a vertical cross-section of the FIG. 2 container taken through the center of the protrusions and dies.

The FIG. 6 of the drawings is a vertical cross section of the FIG. 2 container 4 with the main cover 7 in the closed position, taken through the center of the protrusions 9 and the dies 10. The FIG. 6 drawing illustrates the close fit and seal of the protrusions 9 with the support members (b) closing off the opening port (c). The elastic molding portion (a) of the dies 10 is shown approximately half-full of molding material 19. The external shape of the molding die 10 is maintained by the fluid or powdery material 20 which surrounds the molding dies 10 to maintain the molding die shape.

As seen from the drawing the protrusions 9 of the main cover 7 fit into and close the holes 8 in the top of medium cover 6 of the main body 5 of the container 4. The protrusions 9 have a shape conforming to the supporting member (b) of the elastic molding die 10 and when the main cover 7 is in the closed position the protrusions 9 also serve to close the opening port (c) of the die 10.

Differently from separable molding dies which are made of rigid synthetic resins, the elastic molding dies are susceptible to deformation due to external forces. Hollow molded articles having a normal shape cannot be manufactured if the dies are deformed. Because of this reason, any actions of the elastic molding dies which may cause their deformation while the dies are rotated in all direction, such as contact between the elastic molding dies and vibration, must be avoided. In order to prevent such deformation of elastic molding dies, the dies should be rotated in all directions while their original shape is kept as is. In order to achieve this, it is desirable that the elastic molding die be kept still by holding it firm with a holding member which conforms to the external shape of the elastic molding die. The embodiment illustrated in conjunction with FIGS. 4 and 5 is an example of such an arrangement, wherein the elastic molding die in which the material to be molded is filled is held firm by holes 14 of main body 12 of the container forming solid holding members and cavity 15 of cover 13. This arrangement effectively prevents the elastic molding die from being deformed, affording a hollow molded article of a desired shape.

Given as another example for preventing deformation of the elastic molding die when it is rotated in all directions is an arrangement wherein the container is filled with a fluid or powdery material so as to keep the elastic molding die still in such a fluid or powdery material. For example, in the case of the embodiment illustrated in conjunction with FIGS. 2 and 3, the container may be filled with a prescribed amount of a fluid or powdery material after feeding the material to be molded into the elastic molding die, following which the cover is applied to the container. Then, the opening port of the elastic molding die is closed, the container itself is tightly sealed, and the spinner is rotated. Because the elastic molding die is positioned in the fluid or powdery material, it does not deform while rotated to all directions. In the case of this latter embodiment of FIGS. 2 and 3, it is also possible to use the container body in which holes conforming to the external shape of the elastic molding die are provided for preventing its deformation while rotated to all directions as in the case of the embodiment of FIGS. 4 and 5.

The use of a viscous liquid, e.g., that having a viscosity of 1,000 to 100,000 cP, is preferred for use as the fluid material for preventing the deformation of the elastic molding die. If the viscosity is extremely small, the fluid material cannot prevent deformation of the elastic molding die due to vibration when the material to be molded is solidified while the die is rotated to all directions. If the viscosity is too high, it is difficult to position the elastic molding die in the high viscosity fluid material. In the case where a powdery material is used, its particle size, specific gravity, and the like should be taken into account.

As the materials to be molded by the method of the present invention, those capable of being solidified by cooling, such as chocolates, candies, and the like can be preferably used. There are no restrictions, however, to the types of such materials so long as the same can be solidified along passage of time after filling. There are also no specific limitations to the amount of the material to be molded to be charged into the elastic molding die, inasmuch as such an amount is smaller, preferably 50% or less, than the internal volume of the elastic molding die, and greater than the amount to form a hollow molded article by solidifying along the whole internal surface of the elastic molding die.

Any conventional methods can be applied to parting the solidified hollow molded articles from the elastic molding die. The partition can be done, for example, (i) by covering the whole elastic molding die with a cup which is provided with a breather and discharging the air from the cup via the breather by suction to reduce the pressure therein, thus expanding the elastic molding die; (ii) by covering the supporting member side of the elastic molding die with a cup which is provided with a breather and introducing the air into the cup via the breather to increase the pressure in the cup, thus expanding the elastic molding die; or (iii) expanding the whole elastic molding die by the combination of the methods (i) and (ii). The molded articles are then parted from the expanded elastic molding die and discharged from the expanded opening port.

As illustrated above, according to the method of the present invention, in which a hollow elastic molding die made of an elastic film and having an opening port is provided for feeding the material to be molded of an amount smaller than the internal volume of said elastic molding die thereinto through said opening port, closing said opening port, and solidifying said material to be molded while said elastic molding die is rotated in all directions, can ensure solidification of the material along the internal surface of the elastic molding die with a hollow space therein, thus producing beautiful hollow molded articles with no partition lines on the surface as in the case of the conventional separable molding die. In addition, the elastic molding die can be manufactured not only at a low production cost, but also by a simple process, even if such a die has a complicated shape. These advantages make it possible to easily manufacture a wide variety of complicated hollow molded articles.

Furthermore, the application of the arrangement by which the elastic molding die is held firm by a holding member conforming to the internal shape of the elastic molding die or the arrangement wherein the elastic molding die is positioned in a fluid or powdery material holding member, effectively prevents the die from being deformed while it is rotated to all directions, ensuring the manufacture of hollow molded articles having an intended shape.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a hollow molded article, which comprises providing a hollow elastic molding die made of an elastic film having an internal shape and an internal volume, and having an opening port for providing access to the internal volume, feeding a material to be molded in an amount smaller than the internal volume of said elastic molding die into the internal volume of said elastic molding die through said opening port, closing said opening port, wherein an external shape of said elastic molding die is maintained by a fluid or powdery holding member that conforms to the external shape of the elastic molding die and wherein when the elastic molding die is rotated in all directions it is held firm by said holding member, solidifying said material to be molded while said elastic molding die is rotated in all directions to form a solidified hollow molded article, and removing said solidified hollow molded article from said elastic molding die.

2. The method of manufacturing a hollow molded article according to claim 1 wherein the elastic molding die is rotated in all directions while positioned in a fluid holding member that conforms to the external shape of the elastic molding die.

3. The method of manufacturing a hollow molded article according to claim 1 wherein the elastic molding die is rotated in all directions while positioned in a powdery holding member that conforms to the external shape of the elastic molding die.

4. A method of manufacturing a hollow molded article, which comprises providing a hollow elastic molding die made of an elastic film having an internal shape and an internal volume, and having an opening port for providing access to the internal volume, feeding a material to be molded in an amount smaller than the internal volume of said elastic molding die into the internal volume of said elastic molding die through said opening port, closing said opening port, wherein an external shape of said elastic molding die is maintained by a fluid or powdery holding member that conforms to the external shape of said elastic molding die and wherein the elastic molding die is rotated in all directions, while being held firm by said holding member, by rotating the elastic molding die around its own axis while at the same time rotating the molding die around a central axis, wherein said elastic molding die's axis is perpendicular to said central axis, solidifying said material to be molded while said elastic molding die is rotated to form a solidified hollow molded article on the internal shape of said elastic molding die, and removing said solidified hollow molded article from said elastic molding die.

5. The method of manufacturing a hollow molded article according to claim 4, wherein the elastic molding die is rotated in all directions while positioned in a fluid holding member that conforms to the external shape of the elastic molding die.

6. The method of manufacturing a hollow molded article according to claim 4, wherein the elastic molding die is rotated in all directions while positioned in a powdery holding member that conforms to the external shape of the elastic molding die.

7. A method of manufacturing a hollow molded article, which comprises providing a hollow elastic molding die made of an elastic film and having an opening port and a supporting member having a shape which expands outwardly and conically from the opening port, feeding a material to be molded in an amount smaller than the internal volume of said elastic molding die into said elastic molding die through said opening port, closing said opening port with a closing member having a shape of a truncated cone which conforms to the shape of the supporting member, wherein an external shape of said elastic molding die is maintained by a fluid or powdery holding member that conforms to the external shape of the elastic molding die, solidifying said material to be molded while said elastic molding die is rotated in all directions while being held firm by said holding member, and removing the solidified hollow molded article from the elastic molding die.

8. The method of manufacturing a hollow molded article according to claim 7, wherein the elastic molding die is rotated in all directions while positioned in a fluid, having a viscosity of 1,000 to 100,000 CP, holding member that conforms to the external shape of the elastic molding die.

9. The method of manufacturing a hollow molded article according to claim 7 wherein the elastic molding die is rotated in all directions while positioned in a powdery holding member that conforms to the external shape of the elastic molding die.

10. The method of manufacturing a hollow molded article according to claim 7 wherein the elastic molding die is rotated in all directions while positioned in a fluid holding member that conforms to the external shape of the elastic molding die.

11. A method of manufacturing a hollow molded article, which comprises providing a hollow elastic molding die made of an elastic film and having an opening port and a supporting member having a shape which expands outwardly and conically from the opening port, feeding a material to be molded in an amount smaller than the internal volume of said elastic molding die into said elastic molding die through said opening port, closing said opening port with a closing member having a shape of a truncated cone which conforms to the shape of the supporting member, wherein an external shape of said elastic molding die is maintained by a fluid or powdery holding member that conforms to the external shape of the elastic molding die, solidifying said material to be molded while said elastic molding die is rotated in all directions, while being held firm by said holding member, by rotating the elastic molding die around its own axis while at the same time rotating the molding die around a central axis, wherein said elastic molding die axis is perpendicular to the central axis and removing the solidified hollow molded article from the elastic molding die.

12. The method of manufacturing a hollow molded article according to claim 11, wherein the elastic molding die is rotated in all directions while positioned in a fluid holding member that conforms to the external shape of the elastic molding die.

13. The method of manufacturing a hollow molded article according to claim 11, wherein the elastic molding die is rotated in all directions while positioned in a powdery holding member that conforms to the external shape of the elastic molding die.

* * * * *